April 1, 1924.

J. D. KLINE 1,489,219

HOISTING APPARATUS

Filed March 9, 1922

Inventor
Joseph D. Kline,

Witnesses:
F. L. Fox.

By J. S. Irving King
Attorney

April 1, 1924.

J. D. KLINE

HOISTING APPARATUS

Filed March 9, 1922

Witnesses:
F. L. Fox.

Inventor
Joseph D. Kline,
By J. Irving King
Attorney

Patented Apr. 1, 1924.

1,489,219

UNITED STATES PATENT OFFICE.

JOSEPH D. KLINE, OF LINVILLE DEPOT, VIRGINIA, ASSIGNOR OF ONE-FOURTH TO WILLIAM W. LINCOLN, OF WASHINGTON, DISTRICT OF COLUMBIA, AND ONE-FOURTH TO DAVID R. SHOWALTER, OF HARRISONBURG, VIRGINIA.

HOISTING APPARATUS.

Application filed March 9, 1922. Serial No. 542,340.

*To all whom it may concern:*

Be it known that I, JOSEPH D. KLINE, citizen of the United States, residing at Linville Depot, in the county of Rockingham and State of Virginia, have invented certain new and useful Improvements in Hoisting Apparatus, of which the following is a specification.

This invention relates to power driven hoisting means, the general object of the invention being to provide means for controlling the apparatus from a distant point, for instance, from the wagon, when the apparatus is used for transferring hay from a wagon to a loft, thus rendering the use of an operator for the apparatus unnecessary.

Another object of the invention is to provide means whereby the load will be prevented from falling if anything should happen to the power means, such as the load being too heavy for such means.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which :—

The drawings show the invention as being used for transferring hay from a wagon to a loft, but it will of course be understood that the apparatus can be used for other purposes.

Figure 5:
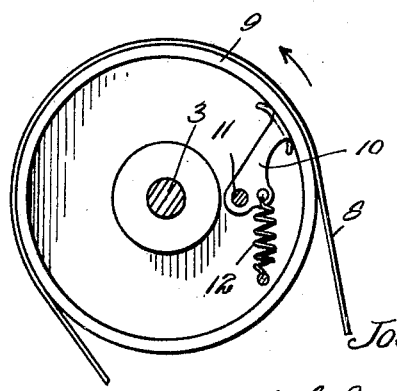
Figure 5 is a detail view of the brake means.

The hoisting apparatus comprises a frame 1, consisting of a base and a pair of uprights, the uprights supporting a stationary shaft 2 and a rotary shaft 3. The shaft 2 has rotatably mounted thereon a drum 4 to which is attached a gear wheel 5. One end of this shaft projects beyond the frame and a double pulley 6 is rotatably mounted on this projecting end. One part of this pulley receives the belt 7 which passes over a pulley on a motor or other source of power. A belt 8 engages the other part of the pulley 6 and this belt 8 passes over a pulley 9 which is fastened to the shaft 3 so that the movement of pulley 6 is communicated to the shaft 3. This shaft 3 and the pulley are prevented from being turned in one direction by a brake shoe 10 which is pivoted to one of the uprights, as at 11, and is held against the inner side of the rim of the pulley by the spring 12. These parts are so arranged that the pulley can travel in the direction of the arrow shown in Figure 5 but cannot travel in an opposite direction. A small gear wheel 13 is loosely mounted on the shaft 3 and meshes with the gear 5. This gear 13 carries the clutch part 14 and a circumferentially grooved clutch part 15 is slidably mounted on shaft 3 but held against rotation on said shaft so that when the clutch parts are in engagement the gear 13 is caused to move with the shaft. The circumferential groove in the clutch part 15 is engaged by one end of a clutch lever 16 which is pivoted to a bracket 17 on the frame, and a cable 18 has one end connected with the other end of said lever 16 and its other end connected with a heavy lever 19 which is pivoted to shaft 2 and carries a belt tightening roll 20 for the belt 8. These parts are so arranged that the gravitational action of the lever 19 will shift the lever 16 to move the clutch part 15 away from the part 14, said part 15 being forced against the part 14 by the spring 21 on shaft 3. When the lever 19 is raised to place roll 20 against the belt 8 so as to cause the belt to grip pulley 9 the spring 21 will force the clutch part 15 into engagement with the clutch part 14 and thus the movement of shaft 3 will be communicated to the drum so as to wind thereon the hoisting cable 23. The cable 18 passes over a guiding pulley 24 mounted on the frame 1.

The lever 19 can be actuated from a distant point by attaching a cable 25 thereto and having the cable run to a point where the operator is located.

Figure 1:
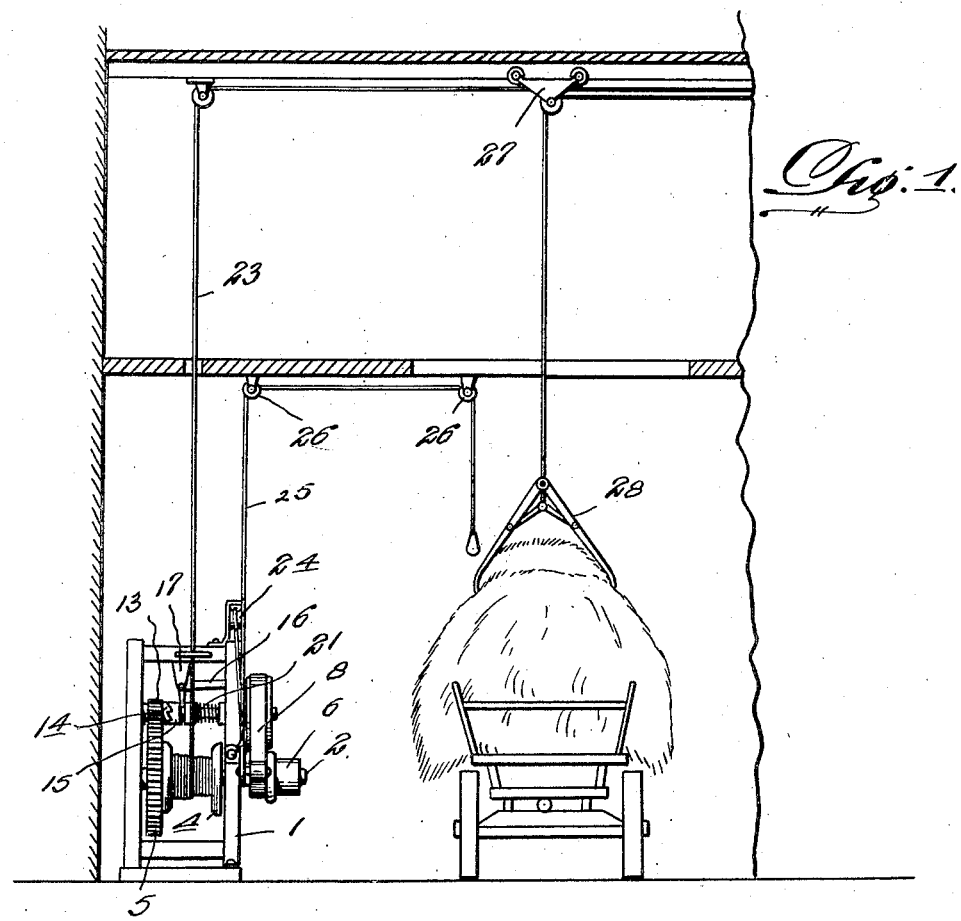
Figure 1 is a view showing the invention used for transferring hay from a wagon to a loft.
Figure 4:
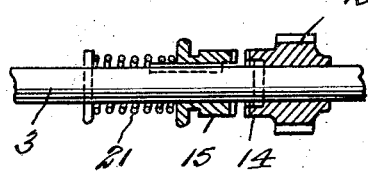
Figure 4 is a detail view of the clutch means.
Figure 2:
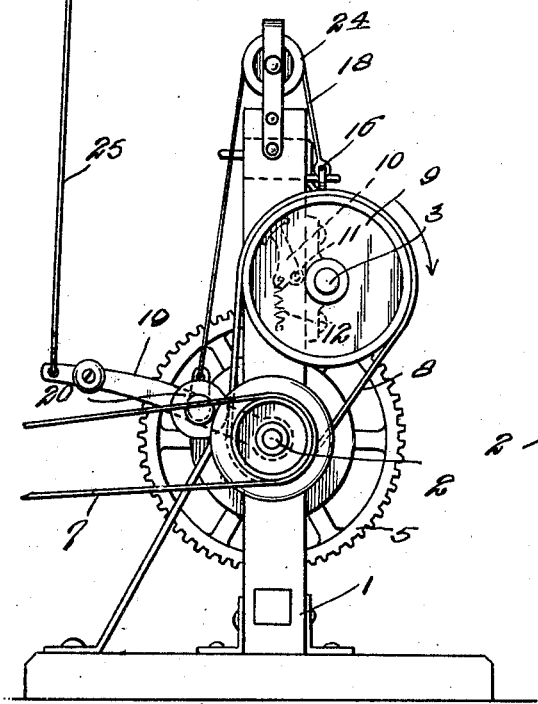
Figure 2 is a side view of the hoisting means.
Figure 3:
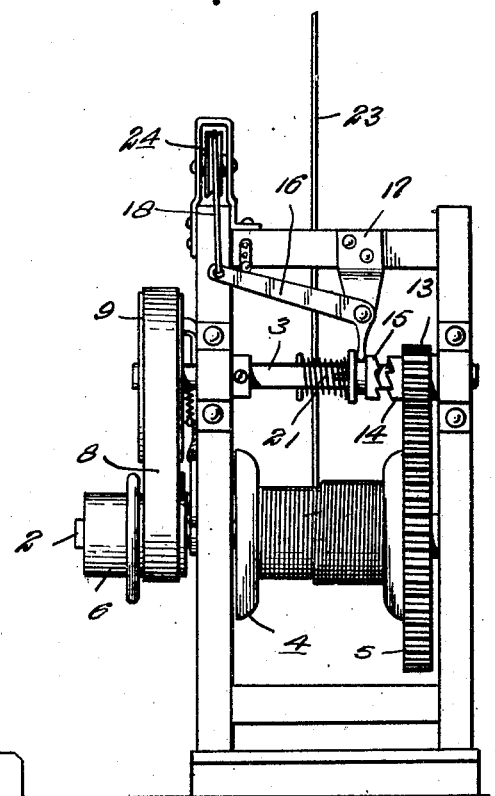
Figure 3 is a front view thereof.

Figure 1 shows the apparatus as being used in a hay barn with the cable 25 passing to a point where it can be grasped by the man on the wagon. This cable passes over suitable guiding pulleys 26. The hoisting cable 23 is connected with the usual hay carrier 27 and with the fork 28.

It will thus be seen that the services of an operator for the hoisting apparatus are not needed as the man on the load can operate said apparatus. When the fork 28 has received its load the operator pulls upon the cable 26 to move the lever 19 upwardly. This movement of the lever will permit the spring 21 to throw the clutch parts into engagement and then the roll 20 will be pressed against the belt 8 to cause the belt to grip pulley 9 and thus rotate the same and shaft 3. This will start the rotation of the drum so that the cable 23 is wound thereon to lift the fork and its load. As the fork strikes the carrier 27 further upward movement of the fork will be prevented and then the carrier will be moved along its track to the dumping position of the fork. The cable 25 is then released so as to permit the lever 19 to drop which will separate the clutch parts and slacken the belt 8, thus stopping the rotation of the drum disconnecting the drum from the driving connection and permitting the cable to be unwound from the drum to return the fork to loading position.

If anything should happen to the apparatus, such for instance, if the belt 7 should slip on the pulley 6 after the load had been partly raised, the load would be prevented from dropping by the brake shoe 10 engaging the pulley 9 and preventing rotation of the same in a reverse direction.

In virtue of the employment of the belt tightening means in combination with the clutch means associated with the shaft 3 and relatively arranged as defined, it will be apparent that on gravitation of the lever 19 rotation of the shaft 3 will be stopped and at the same time the drum 4 will be disconnected from the shaft 3, thereby avoiding unnecessary rotation and wear of the shaft 3 while the drum 4 is being rotated for the unwinding of the cable from the drum and the returning of the fork to loading position. It will also be apparent that the advantage indicated is attained without loss of efficiency inasmuch as the reestablishment of the rotation of the shaft 3 from the power driven member will be synchronous with the clutching of the gear 13 to and the connection of the drum 4 with the shaft 3 so that the drum will be driven from the shaft.

The frame of the hoisting apparatus can be secured to any part of the building, such as the floor or wall thereof, and as before stated the apparatus can be used for other purposes than that shown.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. Power-driven hoisting means comprising a rotatable drum, a hoisting cable associated with and adapted to be taken on and let off said drum, a power driven member, a shaft belted to said member, clutch means for connecting the shaft with the drum, and a belt-tightener operable by an attendant from a distant point and connected with the clutch means and arranged when moved to loosen the belt, to synchronously open the clutch.

2. Power-driven hoisting means comprising a frame, a rotary drum mounted thereon and provided with a gear, a hoisting cable associated with and adapted to be taken on and let off said drum, a power-driven member, a shaft belted to said member, a gear loose on the shaft and meshed with the first-named gear and having a clutch portion, a spring-pressed clutch member splined on the shaft, a lever engaging said clutch member, a gravitational belt-tightening lever equipped to be controlled from a point remote from the hoisting means and movable in a plane at right angles to the plane of movement of the first-named lever, a guide sheave on the frame and disposed in substantially the same vertical plane as said gravitational lever, and a cable passed over said sheave and connecting said levers and movable in a plane at right angles to the first-named lever.

In testimony whereof I affix my signature.

JOSEPH D. KLINE.